(12) United States Patent
Nomura et al.

(10) Patent No.: US 6,797,418 B1
(45) Date of Patent: Sep. 28, 2004

(54) FUEL PROCESSOR FOR FUEL CELL

(75) Inventors: Tadashi Nomura, Saitama (JP); Akifumi Otaka, Saitama (JP); Nobuyuki Kawasaki, Saitama (JP); Yasunori Kotani, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/571,661

(22) Filed: May 15, 2000

(30) Foreign Application Priority Data

May 24, 1999 (JP) .......................................... 11-144135

(51) Int. Cl.$^7$ ........................ H01M 8/00; H01M 8/04; H01M 8/12
(52) U.S. Cl. ............................. 429/13; 429/17; 429/24
(58) Field of Search ............................. 429/13, 17, 22, 429/29, 26

(56) References Cited

U.S. PATENT DOCUMENTS

| | | | | |
|---|---|---|---|---|
| 3,544,376 A | * | 8/1966 | Connor et al. ................. | 429/13 |
| 4,670,359 A | * | 6/1987 | Beshty et al. ................. | 429/17 |
| 5,009,967 A | * | 4/1991 | Scheffler ..................... | 429/23 |
| 5,989,739 A | * | 11/1999 | Zur Megede et al. ......... | 429/13 |
| 6,015,634 A | * | 1/2000 | Bonville, Jr. et al. ......... | 429/17 |
| 6,267,792 B1 | * | 7/2001 | Nagamiya et al. ............ | 48/197 |

FOREIGN PATENT DOCUMENTS

JP          10-144335          5/1988

* cited by examiner

Primary Examiner—Stephen Kalafut
Assistant Examiner—Julian Mercado
(74) Attorney, Agent, or Firm—Arent Fox Kintner Plotkin & Kahn, PLLC (57) ABSTRACT

On the basis of the temperature detected by a temperature detecting sensor, a control section determines whether the fuel processor in a warm up state or a stationary running state. In the machine-warming state, adjusting/supplying unit controls the S/C ratio of the water/fuel mixed gas so as to be lower than that in a stationary running state of the fuel processor. The quantity of water supplied to a vaporizing section is decreased so that the heat quantity required to create the water/fuel mixed gas can be reduced. Thus, the heat quantity used to warm the vaporing section pan be increased, thereby permitting the time for warming the fuel processor to be shortened. Further, even when the water/fuel-mixed gas is reformed to create a reformed gas, excessive water vapor is not left in the reformed gas. Therefore, condensation of water vapor does not occur within the fuel processor.

12 Claims, 3 Drawing Sheets

FUEL PROCESSOR FOR FUEL CELL

FIELD OF THE INVENTION

The present invention relates to a fuel processor for a fuel cell, and more particularly to a fuel processor for a fuel cell capable of shortening a warm up time.

DESCRIPTION OF THE RELATED ART

A polymer electrolyte type of fuel cell includes a stack cell with a polymer electrolyte film sandwiched between an anode and cathode, and generates power through an electrochemical reaction by supplying hydrogen to the anode and oxygen to the cathode.

Since hydrogen ions generated in the anode permeate through the polymer electrolyte film to move to the cathode, in order to hold the ion conductivity of the polymer electrolyte film, it is necessary to supply water to the polymer electrolyte film.

Conventionally, a fuel processor has been used as a source for supplying hydrogen to the fuel cell. The fuel processor vaporizes a raw fuel such as hydrocarbon compound or alcoholic compound and water to create a water/fuel mixed gas and reforms it by using a reforming catalyst, thereby creating a reformed gas containing hydrogen (fuel).

The fuel processor causes the reformed gas to contain excessive water vapor in order to supply water to the polymer electrolyte film of the fuel cell.

Figure 3:
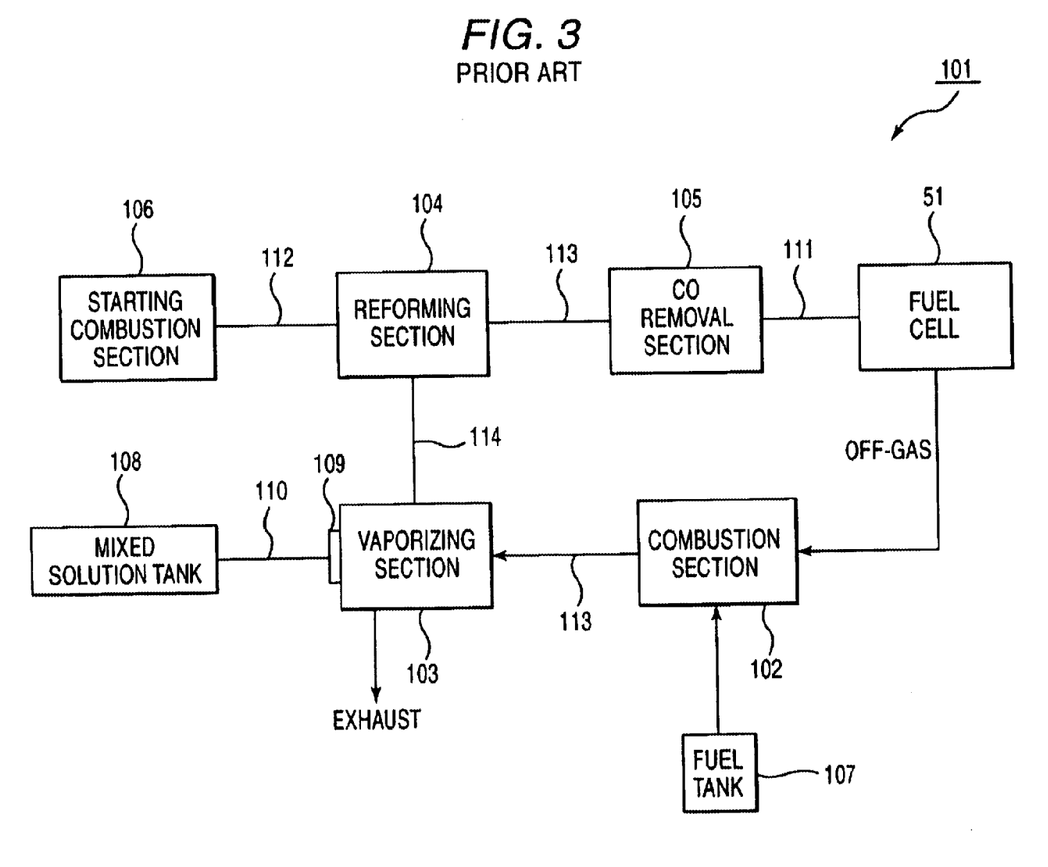
FIG. 3 is a block diagram showing an arrangement of a fuel processor for a fuel cell.

Now referring to the drawings, an explanation will be given of the conventional fuel processor for a fuel cell. FIG. 3 shows an entire arrangement of a conventional fuel processor 101.

The fuel processor 101 mainly includes a combustion section 102 for generating a fuel gas, a vaporizing section 103 for vaporizing a mixed solution of raw fuel and water by heat of the combustion gas to create a water/fuel mixed gas, a reforming section 104 for reforming the water/fuel mixed gas by a reforming catalyst to create a reformed gas containing hydrogen, a carbon-monoxide removal section 105 (hereinafter referred to as CO removal section) for oxidizing/removing carbon monoxide by-produced in the reformed gas by a selective oxidizing catalyst and a starting combustion section 106.

The combustion section 102 includes a catalyst for combustion and is provided with a fuel tank 107 for combustion. The vaporizing section 103 is provided with an injecting device 109 equipped with a mixed solution tank 108 via a conduit 110. The mixed solution tank 108 is filled with a mixed solution of raw fuel and water. The raw fuel is usually an alcoholic component such as methanol and a hydrocarbon compound such as methane, ethane and gasoline.

The starting combustion section 106 includes a catalyst for combustion and is provided with a supplying device (not shown) for supplying fuel for starting combustion and air.

The CO removal section 105 is connected to a polymer electrolyte type fuel cell 51 via a conduit 111.

An explanation will be given of the operation until the fuel processor 101 is started to reach a stationary running state.

First, starting fuel is burned in the starting combustion section 106, and the starting combustion gas thus generated is supplied to the reforming section 104 through the conduit 112 to warm the reforming section 104 and CO removal section 105.

At the same time, combustion fuel is burned in the combustion section 102, and the combustion gas thus generated is supplied to the vaporizing section 103 through the conduit 113 to warm the vaporizing section 103.

When the reforming catalyst in the reforming section 104 reaches about 200° C. and the vaporizing section 103 reaches the temperature (about 200° C.) capable of vaporizing a water/fuel mixed gas, supply of the starting fuel to the starting combustion section 106 is stopped. Simultaneously, the mixed solution is supplied to the injecting device 109 from the mixed solution tank 108 so that the mixed solution is injected into the vaporizing section 103. Then, the mixed solution is vaporized by the heat of the combustion gas supplied from the combustion section 102 thereby to create a water/fuel mixed gas.

The water/fuel mixed gas is supplied to the reforming section 104 via the conduit 114. Simultaneously, the reforming section 104 is supplied with air from the starting combustion section 106. As a result, the raw fuel is reformed into a reformed gas containing hydrogen under the presence of water vapor and oxygen by the reforming catalyst included in the reforming section 104.

The reformed gas is sent to the CO removal section 105 via the conduit 113 so that carbon monoxide by-produced in the reformed gas is oxidized and removed using the selective oxidizing catalyst. The reformed gas thus produced is supplied to the fuel cell 51 via the conduit 111.

In the fuel processor 101 described above, the mol ratio (hereinafter referred to S/C ratio) of steam to carbon(s) (the number of carbon contained in the fuel) in the water/fuel mixed gas is set within a range of 1.5–2.5 so that the mol amount of water vapor in the water/fuel mixed gas is made more than the theoretical reaction mol amount of water in a reforming reaction (in terms of the mol ratio, raw fuel (methanol):water =1:1), thereby leaving the excessive water vapor after the reforming reaction in the reforming gas. Further, by supplying the reformed gas containing the excessive water vapor to the fuel cell 51, water can be supplied to the polymer electrolyte film of the fuel cell 51.

However, the conventional reforming apparatus 101 for a fuel cell has the following problems. In order to increase the S/C ratio of the water/fuel mixed gas is increased, the amount of water to be injected into the vaporizing section 103 is increased. In this case, since the vaporizing heat of water is higher than that of the raw fuel of methanol, a large amount of heat is required to create the water/fuel mixed gas and hence the amount of heat for warming the vaporizing section is reduced. Therefore, it takes a long time to warm the fuel processor 101.

Further, in the conventional reforming apparatus 101, the reforming section 104 and CO removal section 105 are warmed by the starting combustion section 106. In this case, since the CO removal section 105 is provided downstream of the reforming section 104, even when the reforming section 104 is warmed so that the fuel processor 101 reaches its running state, the CO removal section 105 and the conduit 111 downstream thereof are not still warmed (as the case many, the temperature thereof is 80° C. or lower).

In this state, when the reformed gas containing water vapor passes the CO removal section 105 and conduit 111, water vapor is condensed into water in the CO removal section 105 and conduit 111. The remaining water reduces the catalytic capability of the selective oxidizing catalyst to lower the removal efficiency of carbon monoxide and closing the flow path of the reforming gas.

SUMMARY OF THE INVENTION

It is an object of the present invention to provide a fuel processor for a fuel cell which has a short machine-warming running time and does not provide condensation of water vapor in a reformed gas within the apparatus in a machine-warming running state.

In order to attain the above object, the present invention adopts the following constitution.

The fuel processor for a fuel cell according to the invention includes a vaporizing section for vaporizing water and raw fuel containing hydrocarbon to create a water/fuel mixed gas (vaporizing section 3 in an embodiment); and a reforming section for reforming the water/fuel mixed gas to create a reformed gas containing hydrogen (reforming section 4 in the embodiment).

The fuel processor for a fuel cell further includes adjustable supplying means (first and second injecting devices 12 and 13 in the embodiment) for supplying the raw fuel and the water to the vaporizing section and adjusting a mol ratio of steam to carbon(s) (the number of carbon(s) in the fuel) (hereinafter referred to as "S/C ratio") in the water/fuel mixed gas; temperature detecting means (third thermometer 24 in the embodiment) installed on a deriving flow path (deriving conduit 41 in the embodiment) or device downstream of the reforming section to detect a temperature of the deriving flow path or device; and control means (control means 25 in the embodiment) for controlling the adjusting/supplying means on the basis of the temperature detected by the temperature detecting means.

Now, the device downstream of the reforming section refers to a heat exchanger, carbon monoxide removal section (hereinafter referred to as "CO removal section), an auxiliary combustion device, and devices provided as necessary, which are located downstream of the reforming section.

The raw fuel may be alcoholic compound such as methanol and hydrocarbon compound such as methane, ethane and gasoline, etc.

In such a fuel processor, on the basis of the temperature detected by the temperature detecting means, the control means determines whether the fuel processor is in a warm up state or a stationary running state. In the machine-warming state, the S/C ratio of the water/fuel mixed gas is controlled to be lower than that in a stationary running state of the fuel processor. In this case, the quantity of water supplied to the vaporizing section is decreased so that the heat quantity required to create the water/fuel mixed gas can be reduced. Thus, the heat quantity used to warm the vaporizing section can be increased, thereby permitting the time for warming the fuel processor to be shortened.

In the warm up state, when the S/C ratio of the water/fuel mixed gas is made lower than that in the stationary running state, even when the water/fuel mixed gas is reformed to create a reformed gas, excessive water vapor is not left in the reformed gas. Therefore, during the warm up running, condensation of water vapor does not occur within the fuel processor, particularly in the deriving flow path or device downstream of the reforming section.

Incidentally, in the warm up state of the fuel processor, the mol ratio of steam to carbon(s) (hereinafter referred to as S/C ratio) in the water/fuel mixed gas is preferably within a range of 0.7–1.2. In the stationary running state, the S/C ratio of the water/fuel mixed gas is preferably within a range of 1.5–2.5.

The adjusting/supplying means comprises a first supplying unit (a first injecting device 12 in the embodiment) for supplying the raw fuel to the vaporizing section and a second supplying unit (second injecting device 13 in the embodiment) for supplying a mixed solution of the raw fuel and water to the vaporizing section.

When the detected temperature is not higher than the stationary running permitting temperature, the control means causes the first supplying unit and second supplying unit to supply the raw fuel and the mixed solution to the vaporizing section, and when the detected temperature has exceeded the stationary running permitting temperature, the control section causes the first supplying unit to stop supply of the raw fuel.

The stationary running permitting temperature refers to a temperature at which water vapor contained in the reformed gas is not condensed in the deriving path or device downstream of the reforming section. Specifically, the temperature is about in the range of 70–80° C.

When the detected temperature is not higher than the stationary running permitting temperature, the control means determines that the fuel processor in the warm up running state. On the other hand, when the detected temperature has exceeded the stationary running permitting temperature, the control means determines that the fuel processor is in the stationary running state.

The adjustable supplying means in the fuel processor for a fuel cell, which is under the control by the control means, supplies the raw fuel and mixed solution to the vaporizing section when the fuel processor is in the warm up state, and supplies only the mixed solution to the vaporizing section when the fuel processor in the stationary running state. Thus, the S/C ratio of the water/fuel mixed gas in the warm up running state is made lower than that in the stationary running state, and the S/C ratio of the water/fuel mixed gas in the stationary running state is made higher than that in the warm up running state. In this way, the ratio between the raw fuel and water supplied to the vaporizing section can be easily changed so that the S/C ratio in the water/fuel mixed gas can be easily adjusted.

The fuel reforming device for a fuel cell according to the invention further comprises a combustion section (combustion section 2 in the embodiment) for creating a combustion gas serving as a heat source for the vaporizing section, a bypassing passage (bypass conduit 37 in the embodiment) branching from the way of the deriving passage to supply the reformed gas to the combustion section, and a flow path exchanging valve (three-way cock in the embodiment) arranged at a branching portion of the deriving passage and the bypassing passage.

When the detected is not higher than the stationary running permitting temperature, the reformed gas is supplied to the combustion section via the bypassing passage.

In such a fuel processor, during the warm up running state, the reformed gas is supplied to the combustion section and burned so that the combustion section and vaporizing section can be further warmed.

Further, the reformed gas created during the warm up running contains less quantity of water vapor. Therefore, the heat quantity generated during combustion is increased so that the combustion section and vaporizing section can be further warmed.

The fuel processor for a fuel cell according to the invention vaporizing water and raw fuel to create a water/fuel mixed gas and reforms the water/fuel mixed gas to create a reformed gas are constituted as follows. The temperature of a deriving passage or device supplied with the reformed gas is detected (step S16 in the embodiment). In a machine-warming state where the detected temperature is not higher than a stationary running temperature (step S20 in the embodiment), the S/C ratio of the water/fuel mixed gas is controlled to be lower than that in the stationary running state of the fuel processor (steps S21 and S22 in the embodiment). When the detected temperature has exceeded the stationary running temperature, the S/C ratio of the water/fuel mixed gas is controlled to be higher than that in the machine-warming state (steps S18 and 19 in the embodiment).

In such a fuel processor, in the machine-warming state, the S/C ratio of the water/fuel mixed gas is controlled to be lower than that in a stationary running state of the fuel processor. In this case, the quantity of water supplied to the vaporizing section is decreased so that the heat quantity required to create the water/fuel mixed gas can be reduced. Thus, the heat quantity used to warm the vaporizing section can be increased, thereby permitting the time for warm the fuel processor to be shortened.

In the warm up state, the S/C ratio of the water/fuel mixed gas is controlled to be lower than that in the stationary running state, even when the water/fuel mixed gas is reformed to create a reformed gas, excessive water vapor is not left in the reformed gas. Therefore, during the warm up running, condensation of water vapor does not occur within the fuel processor, particularly in the deriving flow path or device downstream of the reforming section.

The fuel processor for a fuel cell according to the invention is characterized in that when the water/fuel mixed gas is created, in the warm up running state, both the raw fuel and a mixed solution of the raw fuel and water are supplied to the vaporizing section for creating the water/fuel mixed gas (steps S21 and S22 in the embodiment); and in the stationary running state, supply of the raw fuel during the warm up running is stopped and the mixed solution is supplied (steps S18 and S19 in the embodiment).

In such a fuel processor, in the warm up state, the raw fuel and mixed solution to the vaporizing section are supplied to the vaporizing section, and in the stationary running state, only the mixed solution is supplied to the vaporizing section. Thus, the S/C ratio of the water/fuel mixed gas in the warm up running state is made lower than that in the stationary running state, and the S/C ratio of the water/fuel mixed gas in the stationary running state is made higher than that in the warm up running state.

In this way, the ratio between the raw fuel and water supplied to the vaporizing section can be easily changed so that the S/C ratio in the water/fuel mixed gas can be easily adjusted.

PREFERRED EMBODIMENTS OF THE INVENTION

Now referring to the drawings, an explanation will be given of a fuel processor for a fuel cell.

Figure 1:
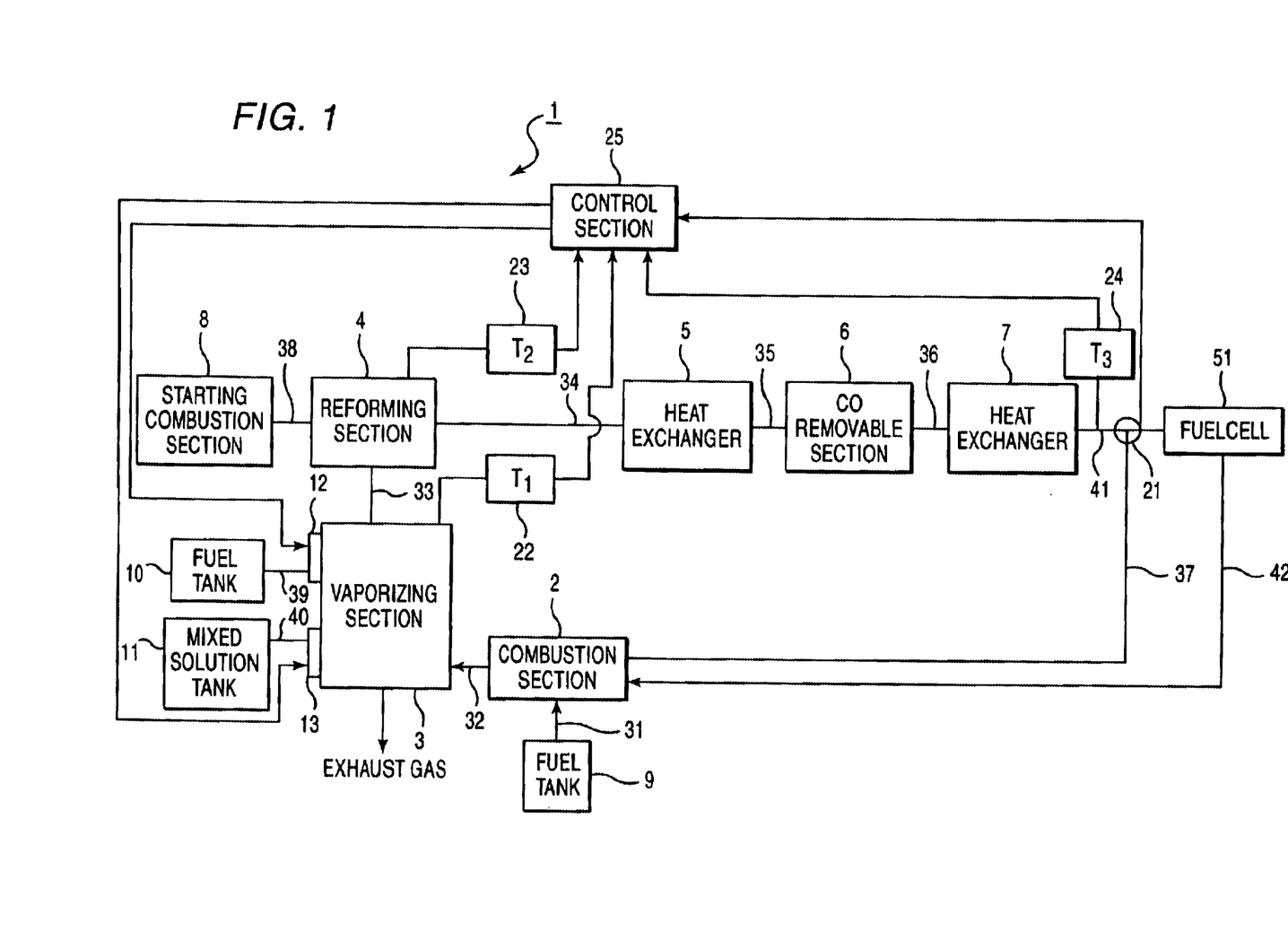
FIG. 1 is a block diagram showing an arrangement of the fuel processor for a fuel cell according to an embodiment of the invention.

FIG. 1 shows an arrangement view of a fuel processor 1 for a fuel cell according to the invention. The fuel processor 1 mainly includes a combustion section 2 for generating a fuel gas, a vaporizing section 3 for vaporizing a mixed solution of raw fuel and water by heat of the combustion gas to create a water/fuel mixed gas, a reforming section 4 for reforming the water/fuel mixed gas to create a reformed gas containing hydrogen, a CO removal section 6 for oxidizing/removing carbon monoxide by-produced in the reformed gas and a starting combustion section 8.

The combustion section 2 includes a catalyst for combustion (not shown) and is provided with a fuel tank 9 for combustion. The fuel from the fuel tank 9 to the combustion section 2 is burned on the catalyst and the combustion gas thus generated is supplied to the vaporizing section 3.

The vaporizing section 3 is provided with a first injecting device 12 which is a first supplying unit and a second injecting device 13 which is a second supplying unit. The first injecting device is equipped with a fuel tank 10 via a conduit 39. The second injecting device is equipped with a mixed solution tank 11 via a conduit 40.

These first injecting device 12 (first supplying unit) and second injecting device 13 (second supplying unit) constitute an adjustable supplying unit.

The adjustable supplying unit serves to supply raw fuel and water and also adjust the mol ratio (hereinafter referred to as S/C ratio) of steam to carbon(s) in a water/fuel mixed gas.

The fuel tank 10 is filled with the raw fuel and the mixed solution tank 11 is filled with a mixed solution of raw fuel and water. The raw fuel may be an alcoholic component such as methanol and a hydrocarbon compound such as methane, ethane and gasoline.

The reforming section 4 includes a reforming catalyst. When the reforming catalyst heated to 200° C. or higher as well as oxygen in air is supplied to the reforming section 4, the reactions represented by the following Equations (1)–(3) proceed on the reforming catalyst to create a reforming gas. It should be noted that the reaction equations (1)–(3) represent the reactions when methanol is used as the raw fuel.

$$CH_3OH + H_2O \rightarrow 3H_2 + CO_2 \ldots \quad (1)$$

$$CH_3OH + 2O_2 \rightarrow 2H_2O + CO_2 \ldots \quad (2)$$

$$CH_3OH \rightarrow 2H_2 + CO \ldots \quad (3)$$

The reaction Equation (1) is a reforming reaction by methanol, which is raw fuel, and water to create hydrogen ($H_2$), the reaction Equation (2) is an oxidizing reaction of methanol to create water ($H_2O$), and the reaction Equation (3) is a decomposition reaction of methanol to create a small quantity of carbon monoxide (CO).

The reforming reaction (reaction Equation (1)) is a heat absorbing reaction to require supply of heat from the exterior. The heat is supplied as the oxidizing heat generated by the oxidation of methanol (reaction Equation (2)).

In this way, the reformed gas containing hydrogen (fuel), water vapor (water) and carbon monoxide (CO) is created.

In the fuel processor 1 described above, during the stationary running, the mol ratio (hereinafter referred to S/C ratio) of steam to carbon(s) in the water/fuel mixed gas is set within a range of 1.5–2.5 so that the mol amount of water vapor in the water/fuel mixed gas is made more than the theoretical reaction mol amount of water in a reforming reaction (in terms of the mol ratio, raw fuel (methanol) :water=1:1), thereby leaving the excessive water vapor after the reforming reaction in the reforming gas. Further, by supplying the reformed gas containing the excessive water vapor to the fuel cell 51, water can be supplied to the polymer electrolyte film of the fuel cell 51.

The starting combustion section 8 includes a catalyst for combustion (not shown) and is provided with a supplying device (not shown) for supplying fuel for starting combustion and air.

A heat exchanger 5 is connected via conduits 34 and 35 between the reforming section 4 and CO removal section 6, i.e. downstream of the reforming section 4. A heat exchanger 7 is connected downstream of the CO removal section 6 via a conduit 36, and a polymer electrolyte type fuel cell 51 is connected downstream of the heat exchanger 7 via a deriving conduit 41.

The heat exchanger 5 serves to control the reformed gas supplied from the reforming section 4. The heat exchanger 5 is provided in order to cool the reformed gas from the reforming section, which is heated to 200° C. or higher, to about 100° C. because the operating temperature of the CO removal section 6 is 100–150° C.

The CO removal section 6 includes a selective oxidizing catalyst (not shown). The selective oxidizing catalyst is previously heated at about 100° C. The carbon monoxide contained in the reformed gas is oxidized by this selective oxidizing catalyst to create carbon dioxide ($CO_2$). Thus, the carbon monoxide in the reformed gas is removed.

The heat exchanger 7 serves to cool the reformed gas supplied form the CO removal section 6. The heat exchanger 7 is provided in order to cool the reforming gas, which has been heated at 150–200° C. when it exits from the CO removal section 6, to about 80° C. because the operating temperature of the fuel cell at the rear step is about 80–130° C.

The reformed gas passed through the heat exchanger 7 is supplied to the fuel cell 51 via the deriving conduit 41. In the fuel cell, the hydrogen (fuel) contained in the reformed gas electrochemically reacts with the oxygen supplied separately to generate power.

Further, the gas containing non-reacting gas discharged form the fuel cell 51 is supplied to the combustion section 2 through a conduit 42 so that the non-reacting gas is burned in the combustion section 2.

The vaporizing section is equipped with a first thermometer 22; the reforming section 4 is equipped with a second thermometer 23; and the deriving conduit 41 is equipped with a third thermometer 24. These first, second and third thermometers 22, 23 and 24 are connected to a control section 25.

The control section 25 is connected to the first and second injecting devices 12 and 13 which are the first and second supplying units, respectively.

The control section 25 serves to control the first and second injecting devices 12 and 13 which are adjustable supplying unit on the basis of the temperature detected by the third thermometer 24. When the detected temperature is not higher than a stationary running permitting temperature, the control section 25 causes the first and second injecting devices 12 and 13 to supply the raw fuel and mixed solution to the vaporizing section. On the other hand, when the detected temperature has exceeded the stationary running permitting temperature, the control section 25 causes the first injecting device 12 to stop supply of the raw fuel.

Now, the stationary running permitting temperature refers to the temperature when the water vapor contained in the reformed gas is not condensed in the deriving conduit 41 downstream of the reforming section 4, concretely 70° C.–80° C.

The deriving conduit 41 branches into a bypassing tube 37 connected to the combustion section 2. A three-way valve 21 is attached to the branching portion of the deriving conduit 41 into the bypassing tube 37. The three-way valve 21 is connected to the control section 25.

Figure 2:
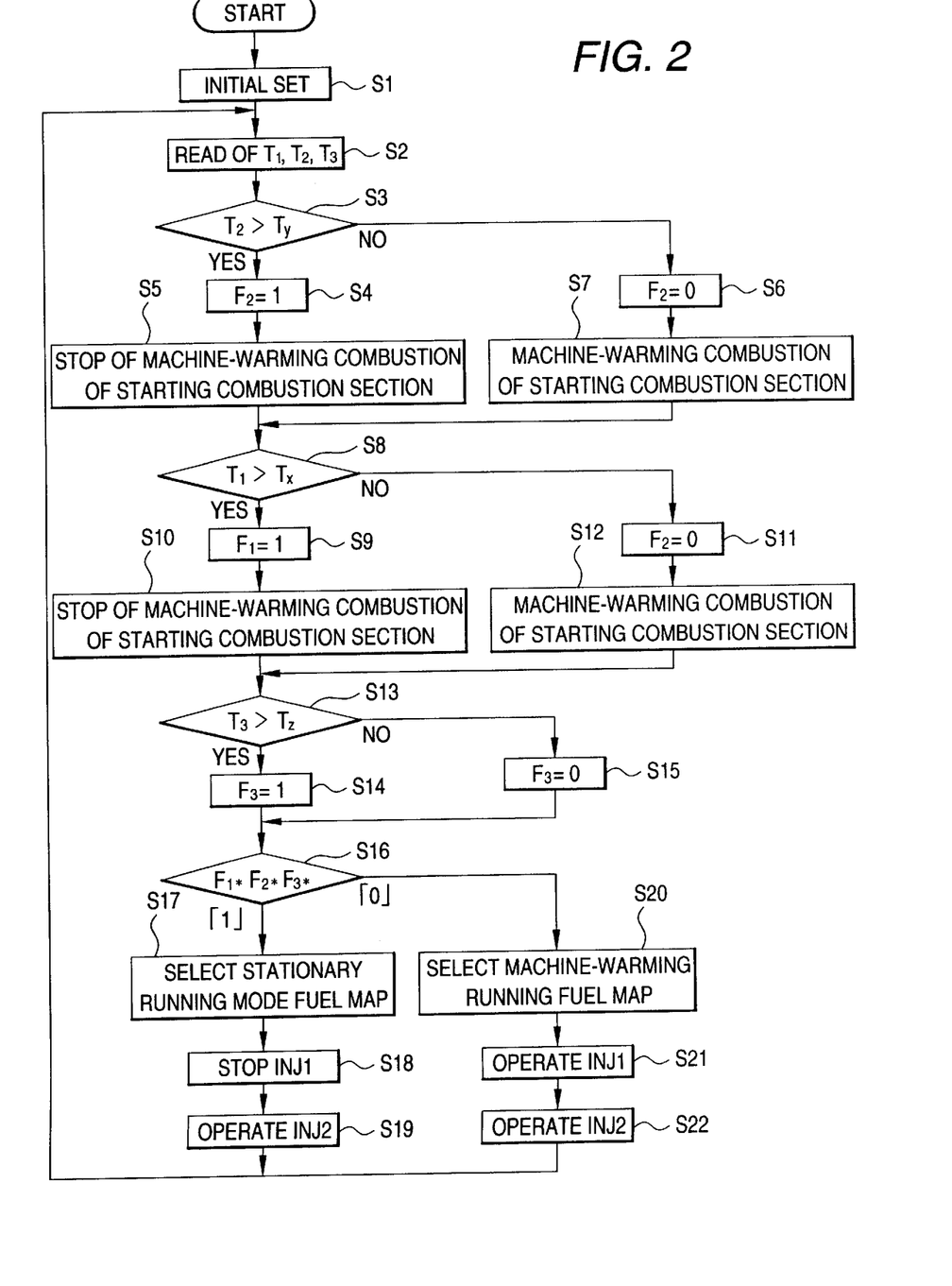
FIG. 2 is a flowchart for explaining the operation of a control section in a fuel processor for a fuel cell according to an embodiment of the invention.

As regard the operation of the control section of the fuel processor 1, referring to FIGS. 1 and 2, an explanation will be given of the operation from when the fuel processor starts to when it reaches the stationary running state.

First, in step S1, the memory in the control section 25 is set at an initial value, and the deriving conduit 41 and bypassing conduit 37 are coupled with each other by the ternary valve 21.

In step S2, the detected temperatures $T_1$, $T_2$ and $T_3$ are read by the first, second and third thermometers 22, 23 and 24.

In step S3, whether or not the detected temperature $T_2$ of the second thermometer 23 for detecting the temperature of the reforming section 4 has exceeded a reforming starting temperature $T_y$ is determined by a reforming starting temperature determining unit within the control section 25. The reforming starting temperature $T_y$ refers to an activating temperature where a reforming reaction proceeds with the aid of a reforming catalyst, and is set at a temperature of 180° C.–250° C.

When the detected temperature $T_2$ has exceeded the reforming starting temperature $T_y$, in step S4, "1" is inputted for a flag F2 for determining the reforming starting temperature. When the detected temperature $T_2$ is not higher than the reforming starting temperature $T_y$, in step S6, "0" is inputted for the flag F2.

When the flag F2 is "0", in step S7, the fuel f or starting and air are supplied to the starting combustion section 8 and the fuel is burned. The starting combustion gas thus generated is sent to the reforming section 4 and its downstream side via the conduit 38. Thus, the reforming section 4, heat exchangers 5, 7, CO removal section 6, conduits 34, 35, 36 and deriving conduit 41 are warmed.

In step S8, whether or not the detected temperature $T_1$ of the first thermometer 22 for detecting the temperature of the vaporizing section 3 has exceeded a reforming starting temperature $T_x$ is determined by a vaporizing starting temperature determining unit within the control section 25. The vaporizing temperature refers to a temperature where water and raw fuel can be vaporized instantaneously, and is set at a temperature of 150–250° C.

When the detected temperature $T_1$ has exceeded the vaporizing starting temperature $T_x$, in step S9, "1" is inputted for a flag F1 for determining the vaporizing starting temperature. When the detected temperature $T_1$ is not higher than the vaporizing starting temperature $T_x$, in step S11, "0" is inputted for the flag F1.

When the flag F1 is "0", in step S12, the fuel for starting is burned in the combustion section 2 to create a combustion gas. The combustion gas thus generated is sent to the vaporizing section 3 and its downstream side via the conduit 32. Thus, the vaporizing section 3, reforming section 4, heat exchangers 5, 7, CO removal section 6, conduits 34, 35, 36 and deriving conduit 41 are warmed.

In step S13, whether or not the detected temperature $T_3$ of the third thermometer 24 for detecting the temperature of the deriving conduit 41 has exceeded a stationary running starting temperature $T_z$ is determined by a stationary running starting temperature determining unit within the control section 25. The stationary running permitting temperature $T_z$ refers to a temperature where water vapor contained in the reformed gas is not condensed in the deriving conduit 41, and is set at a temperature of 70 –80° C.

When the detected temperature $T_3$ has exceeded the stationary running starting temperature $T_z$, in step S14, "1" is inputted for a flag F3 for determining the stationary running starting temperature. When the detected temperature $T_3$ is not higher than the stationary running starting temperature $T_z$, in step S15, "0" is inputted for the stationary running starting temperature determining flag F3.

In step S16, the respective input values of the vaporizing starting temperature determining F1, reforming starting temperature determining flag F2 and stationary running starting temperature determining F3 are determined in a stationary running determining unit within the control section 25.

Where the input value of either one of these vaporizing starting temperature determining F1, reforming starting temperature determining flag F2 and stationary running starting temperature determining F3 is "0" (F1*F2*F3=0), it is determined that the fuel processor is in a warm up state. Thereafter, the processing proceeds to step S20.

In step S20, a warm up mode is selected to continue warm up running. Specifically, the control section 25 supplies operation signals to the first and second injecting devices 12 and 13. In step S21, the first injecting device 12 supplies the raw fuel to the vaporizing section 3, and in step S22, the second injecting device 13 supplies the mixed solution to the vaporizing section 3. Thus, the water/fuel mixed gas is created to continue to warm the reforming section 4, heat exchangers 5, 7, CO removal section 6, conduits 34, 25, 26, and deriving conduit 41.

The water/fuel mixed gas is transferred from the bypassing conduit 37 to the combustion section 2 via the three-way cock 21. Thus, hydrogen contained in the water/fuel mixed gas is burned to warm the combustion section 2.

The S/C ratio of the water/fuel mixed gas created at this time is set in a range of 0.7–1.2.

The water/fuel mixed gas is supplied to the reforming section 4. Air (oxygen) is also supplied to the reforming section 4. As a result, in the reforming section 3, the above reaction Equations of (1)–(3) proceed on the reforming catalyst, thereby creating the reformed gas containing hydrogen.

In the reformed gas thus created, the S/C ratio of the water/fuel mixed gas is within a range of 0.7–1.2 so that the mol amount of water vapor supplied to the reforming section is approximately equal to the theoretical reaction mol amount of water in a reforming reaction (in terms of the mol ratio, raw fuel (methanol):water=1:1). Therefore, the water vapor is not left in the reformed gas after the reforming reaction. As a result, even if the temperature of each of the heat exchangers 5, 7, CO removal section 6, conduits 34, 35, 36 and deriving conduit 41 is low, water vapor will not be condensed in these conduits and devices.

In this way, the warm up running is continued so that the detected temperature $T_1$, $T_2$ and $T_3$ of the first, second and third thermometers 22, 23 and 24 are gradually increased.

Returning to step S2 again, the detected temperatures $T_1$, $T_2$ and $T_3$ of the first, second and third thermometers 22, 23 and 24 are read.

In step S3, whether or not the detected temperature $T_2$ of the second thermometer has exceeded the reforming starting temperature $T_y$ is determined again by the reforming starting temperature determining unit within the control section 25.

If the reforming starting temperature determining flag F2 is set at "1" as a result that the detected temperature $T_2$ of the second thermometer 23 has exceeded the reforming starting temperature $T_y$ (step S4), in step S5, supply of the fuel for starting to the combustion section 8 is stopped. Thus, the combustion in the starting combustion section 8 is stopped. However, only air is supplied. The air is supplied to the reforming section 4 via the conduit 38.

In step S8, whether or not the detected temperature $T_1$, of the first thermometer 22 has exceeded the vaporizing starting temperature $T_x$, is determined again by a vaporizing starting temperature determining section in the control section 25.

If the vaporizing starting temperature determining flag F1 is set at "1" as a result that the detected temperature $T_1$, of the first thermometer 22 has exceeded the vaporizing starting temperature $T_x$. (step S9), supply of the fuel for combustion to the combustion section 2 is stopped.

In step S13, whether or not the detected temperature $T_3$ of the third thermometer 24 has exceeded the stationary running starting temperature $T_z$. is determined again by the stationary running starting temperature determining unit in the control section 25.

If the detected temperature $T_3$ of the third thermometer 24 has exceeded the stationary running starting temperature $T_z$, the stationary running starting temperature F3 is set at "1" (step S14). The processing proceeds step S16.

In step S16, the respective input values of the vaporizing starting temperature determining F1, reforming starting temperature determining flag F2 and stationary running starting temperature determining F3 are determined again by the stationary running determining unit within the control section 25.

If all the respective input values of the vaporizing starting temperature determining F1, reforming starting temperature determining flag F2 and stationary running starting temperature determining F3 are "1" (F1*F2*F3=1), it is determined that the fuel reforming device 1 has fallen into the stationary running state from the warm up running state. The processing proceeds to step S17.

In step S17, the stationary running mode is selected, and the stationary running is started. Specifically, the control section 25 supplies a stopping signal to the first injecting device 12 so that supply of the raw fuel from the first injecting device 12 to the vaporizing section 3 is stopped (step S18), whereas supply of the mixed solution from the second injecting device 13 is continued to create the water/fuel mixed gas (step S19). The three-way valve 21 is exchanged to couple the deriving conduit 41 with the fuel cell 51.

The S/C ratio of the water/fuel mixed gas created at this time is within a range of 1.5–2.5.

The reforming section is supplied with the water/fuel mixed gas and also supplied with air (oxygen) from the starting combustion section 8. The above reaction Equations (1)–(3) proceed on the reforming catalyst so that the reformed gas containing hydrogen is created.

In the reformed gas thus created, the S/C ratio of the water/fuel mixed gas is within a range within a range of 1.5–2.5 so that the mol amount of water vapor supplied to the reforming section 4 exceeds the theoretical reaction mol amount of water in a reforming reaction (in terms of the mol ratio, raw fuel (methanol):water=1:1). Therefore, excessive water vapor is left in the reformed gas after the reforming reaction.

The reformed gas containing the excessive water vapor is supplied to the fuel cell 51 thorough the CO removal section 51 and three-way valve 21. Thus, water is supplied to the polymer electrolyte film of the fuel cell 51.

Additionally, if the S/C ratio of the water/fuel mixed gas at this time (stationary running state) is not higher than 1.5, the quantity of water vapor is decreased and hence the water vapor left in the reformed gas is reduced. As a result, sufficient quantity of water cannot be supplied to the polymer electrolyte of the fuel cell 51. Where the S/C ratio of the water/fuel mixed gas exceeds 2.5, the quantity of water vapor is increased so that the excessive water vapor is left in the reforming gas. As a result, water stands in the conduits or devices downstream of the reforming section 4 and the fuel cell 51. Both cases are not preferable.

Since the temperature of the deriving conduit 41 has risen to the temperature at which water vapor is not condensed (stationary running permitting temperature), water vapor is not condensed within the deriving conduit 41.

Where the temperature of the deriving conduit 41 has risen to the stationary running permitting temperature, the temperature of each of the heat exchangers 5, 7, CO removal section 6, conduits 34, 35 and 36 has necessarily risen to the higher temperature than the deriving conduit 41. Therefore, water vapor will not be condensed within these conduits or devices.

As described above, the fuel processor for a fuel cell according to the invention includes adjustable supplying unit for supplying the raw fuel and water to the vaporizing section and adjusting the S/C ratio in the water/fuel mixed gas, temperature detecting unit installed on a deriving flow path (deriving conduit 41 in the embodiment) or device, and control unit for controlling the adjustable supplying unit on the basis of the temperature detected by the temperature detecting unit. The control unit determines whether the fuel processor is in 10 a warm up running state or a stationary running state. In the machine-warming state, the S/C ratio of the water/fuel mixed gas is controlled to be lower than that in the stationary running state of the fuel processor. In this case, the quantity of water supplied to the vaporizing section is decreased so that the heat quantity required to create the water/fuel mixed gas can be reduced. Thus, the heat quantity used to warm the vaporizing section can be increased, thereby permitting the time for warming the fuel processor to be shortened.

In the warm up running state, when the S/C ratio of the water/fuel mixed gas is made lower than that in the stationary running state, excessive water vapor is not left in the reformed gas created from the water/fuel mixed gas. Therefore, during the warm up running, condensation of water vapor does not occur within the fuel processor, particularly in the deriving flow path or device downstream of the reforming section.

The adjustable supplying unit in the fuel processor for a fuel cell, which is under the control by the control unit, supplies the raw fuel and mixed solution to the vaporizing section when the fuel processor is in the warm up state, and supplies only the mixed solution to the vaporizing section when the fuel processor in the stationary running state. Thus, the S/C ratio of the water/fuel mixed gas in the warm up running state is made lower than that in the stationary running state, and the S/C ratio of the water/fuel mixed gas in the stationary running state is made higher than that in the warm up running state. In this way, the ratio between the raw fuel and water supplied to the vaporizing section can be easily changed so that the S/C ratio in the water/fuel mixed gas can be easily adjusted.

The fuel reforming device for a fuel cell according to the invention has a bypassing passage branching from the way of the deriving passage to supply the reformed gas to the combustion section. When the detected temperature is not higher than the stationary running permitting temperature, the reformed gas is supplied to the combustion section via the bypassing passage. Therefore, during the warm up running state, the reformed gas is supplied to the combustion section and burned so that the combustion section and vaporizing section can be further warmed.

Further, the reformed gas created during the warm up running contains less quantity of water vapor. Therefore, the heat quantity generated during combustion is increased so that the combustion section and vaporizing section can be further warmed.

In the fuel processor for a fuel cell according to the invention, the temperature of a deriving passage or device supplied with the reformed gas is detected, and in a machine-warming state where the detected temperature is not higher than a stationary running temperature, the S/C ratio of the water/fuel mixed gas is controlled to be lower than that in the stationary running state of the fuel processor. In this case, the quantity of water supplied to the vaporizing section is decreased so that the heat quantity required to create the water/fuel mixed gas can be reduced. Thus, the heat quantity used to warm the vaporizing section can be increased, thereby permitting the time for warming the fuel processor to be shortened.

Even when the water/fuel mixed gas is reformed to create a reformed gas, excessive water vapor is not left in the reformed gas. Therefore, condensation of water vapor does not occur within the fuel processor, particularly in the deriving flow path or device downstream of the reforming section.

Further, in the stationary running state where the detected temperature has exceeded the stationary running state, the S/C ratio in the water/fuel mixed gas is controlled to be higher than that in the warm up running state so that excessive water vapor can be left in the reformed gas.

What is claimed is:

1. A fuel processor for a fuel cell comprising:
    a vaporizing section for vaporizing water and raw fuel containing hydrocarbon to create a water/fuel mixed gas;
    a reforming section for reforming said water/fuel mixed gas to create a reformed gas containing hydrogen;
    adjustable supplying means for supplying said raw fuel and said water to said vaporizing section and adjusting a mol ratio of water to the raw fuel in said water/fuel mixed gas;
    temperature detecting means installed at a position which is downstream of said reforming section to detect a temperature of said position; and
    control means for controlling said adjustable supplying means on the basis of the temperature detected by said temperature detecting means.

2. The fuel processor for a fuel cell according to claim 1, wherein:
    said adjustable supplying means comprises a first supplying unit for supplying the raw fuel to said vaporizing section and a second supplying unit for supplying a mixed solution of the raw fuel and water to said vaporizing section;
    when said detected temperature is not higher than a stationary running permitting temperature, said control means causes said first supplying unit and second supplying unit to supply said raw fuel and said mixed solution to said vaporizing section; and
    when said detected temperature has exceeded the stationary running permitting temperature, said control means causes said first supplying unit to stop supply of the raw fuel.

3. The fuel processor for a fuel cell according to claim 2, wherein, the mol ratio of steam to carbon(s) (S/C ratio) in the water/fuel mixed gas during a stationary running state is higher than the S/C ratio in the water/fuel mixed gas during a warm up state.

4. The fuel processor for a fuel cell according to claim 3, wherein the S/C ratio in the water/fuel mixed gas during the warm up state is within a range of 0.7–1.2; and the S/C ratio of the water/fuel mixed gas during the stationary running state is within a range of 1.5–2.5.

5. The fuel processor for a fuel cell according to claim 2, wherein the stationary running permitting temperature refers to a temperature at which water vapor contained in the reformed gas is not condensed in a deriving path or a device downstream of said reforming section.

6. The fuel processor for a fuel cell according to claim 9, wherein the stationary running permitting temperature is within the range of 70–80° C.

7. The fuel processor for a fuel cell according to claim 1, further comprising:

a combustion section for creating a combustion gas serving as a heat source for said vaporizing section, a bypassing passage branching from a deriving passage to supply said reformed gas to said combustion section, said deriving passage disposed between said reforming section and the fuel cell and a flow path exchanging valve arranged at a branching portion of said deriving passage and said bypassing passage;

wherein when said detected temperature is not higher than the stationary running permitting temperature, said reformed gas is supplied to said combustion section via said bypassing passage.

8. The fuel processor for a fuel cell according to claim 1, wherein said temperature detecting means is installed to a deriving flow path downstream of said reforming section.

9. The fuel processor for a fuel cell according to claim 1, wherein said temperature detecting means is installed to a device downstream of said reforming section.

10. The fuel processor for a fuel cell according to claim 9, wherein said device is at least one of a heat exchanger, carbon monoxide removal section, an auxiliary combustion device.

11. A method for controlling a fuel processor for a fuel cell which vaporizes water and raw fuel to create a water/fuel mixed gas and reforms the water/fuel mixed gas to create a reformed gas, comprising the steps of:

detecting a temperature of a deriving passage or device supplied with said reformed gas;

judging as to whether the temperature is higher than a stationary running temperature or not;

in a machine-warming state where the detected temperature is not higher than the stationary running temperature, controlling the mol ratio of water to the raw fuel in said water/fuel mixed gas to be lower than that in a stationary running state of the fuel processor, and in a stationary running state where the detected temperature exceeds the stationary running temperature, controlling the mol ratio of water to the raw fuel in said water/fuel mixed solution to be higher than that in said machine-warming state.

12. A fuel processor for a fuel cell comprising:

a vaporizing section for vaporizing water and raw fuel containing hydrocarbon to create a water/fuel mixed gas;

a reforming section for reforming said water/fuel mixed gas to create a reformed gas containing hydrogen;

an adjustable supplying device for supplying said raw fuel and said water to said vaporizing section and adjusting a mol ratio of water to the raw fuel in said water/fuel mixed gas;

a temperature detecting device installed at a position which is downstream of said reforming section to detect a temperature of said position; and a controller for controlling said adjustable supplying device on the basis of the temperature detected by said temperature detecting device.

* * * * *